J. C. BELL.
COOKING UTENSIL.
APPLICATION FILED MAY 10, 1921.
1,432,950.                      Patented Oct. 24, 1922.
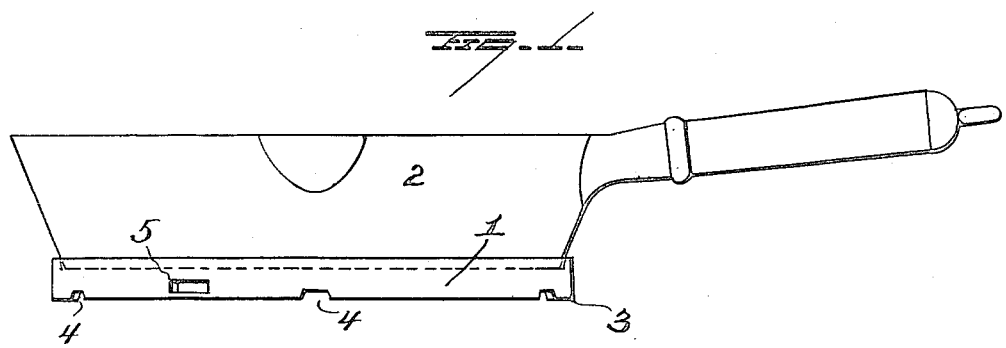
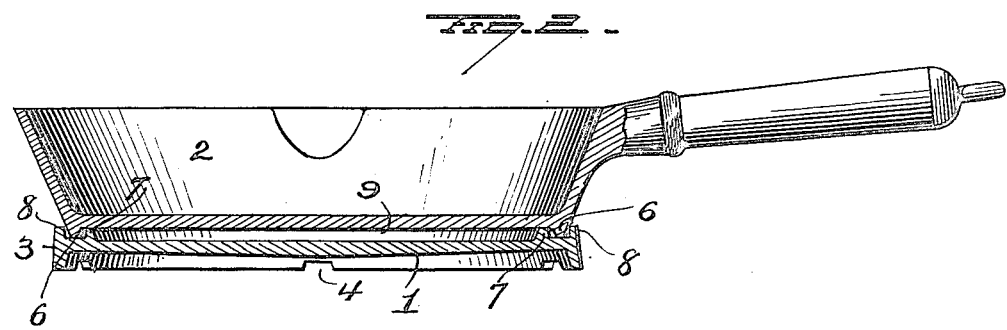
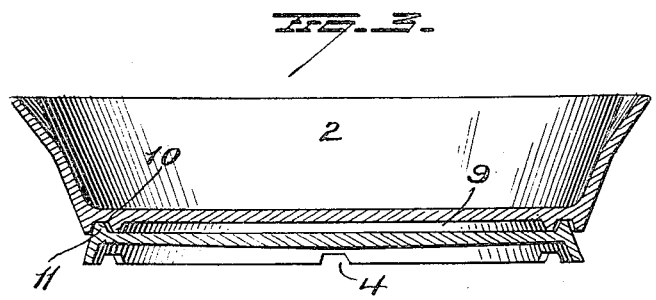

Patented Oct. 24, 1922.

1,432,950

UNITED STATES PATENT OFFICE.

JOHN C. BELL, OF DETROIT, MICHIGAN.

COOKING UTENSIL.

Application filed May 10, 1921. Serial No. 468,282.

*To all whom it may concern:*

Be it known that I, JOHN C. BELL, a citizen of the United States, and a resident of Detroit, in the county of Wayne and State of Michigan, have invented certain new and useful Improvements in Cooking Utensils; and I do hereby declare the following to be a full, clear, and exact description of the invention, such as will enable others skilled in the art to which it appertains to make and use the same.

This invention relates to improvements in cooking utensils,—one object of the invention being to provide a cooking utensil comprising separable parts and adaptable more particularly for use on gas or other stoves, which shall have such construction as to prevent overheating of the bottom of that portion of the utensil to contain the food to be cooked and to ensure the even distribution of heat under this portion of the utensil.

With this and other objects in view, the invention consists in certain novel features of construction and combinations of parts as hereinafter set forth and pointed out in the claims.

In the accompanying drawings, Figure 1 is a view illustrating an embodiment of my invention. Fig. 2 is a transverse sectional view, and Fig. 3 is a sectional view showing a modification.

In the drawing I have shown my improvements as embodied in a cooking utensil of the "frying-pan" or "skillet" type but it is evident that they may be embodied in other types of cooking utensils.

My improved utensil comprises two members which are separable, one from the other, the lower member 1 being adaptable to be placed over the burner of a gas or other stove and the member 2 being superimposed on and supported by the member 1. The lower member 1 of the utensil may be made of cast iron or other metal and provided with a depending annular flange 3 and this flange may be notched as at 4 to accommodate it to the spider arrangement over the burner of the stove, and said flange may also be provided with a slot or opening 5 to receive a lifter. The cast-iron or other metal member 1 is preferably made comparatively thick in the center and diminishing in thickness toward the periphery, and is therefore not liable to warp or crack.

In the embodiment of the invention shown in Figures 1 and 2, the upper member 2 of the device which receives the food to be cooked, is provided with a depending annular flange or rib 6 and the lower member 1 is formed with concentric annular ribs 7—8 spaced apart and forming an annular groove between them to receive the flange or rib 6 of the member 2. The annular ribs on the respective members of the device are so proportioned that when said members are assembled, an air space 9 will be formed between said members and this air space will be closed by the intermeshing of the ribs on the respective members of the utensil. The space 9 thus forms in effect a sealed dead air chamber between the two members of the utensil and ensures an even distribution of heat under the member of the utensil which receives the food to be cooked and accidental burning or scorching of the food will be prevented.

While the lower member 1 of the utensil will preferably be made of cast iron or other metal as previously stated, I prefer to make the upper food containing member of aluminum.

The intermeshing of the ribs on the respective members of the utensil not only closes the air space between said members but also form means whereby accidental displacement of the upper member relatively to the lower member will be prevented.

Instead of providing the lower member with two annular ribs to form a groove receiving the annular rib on the upper member, I may construct the bottom of the upper member to form an annular groove 10 which will receive a single annular rib 11 on the lower member 1, as shown in Figure 3.

Having fully described my invention what I claim as new and desire to secure by Letters-Patent, is:

1. A cooking utensil, comprising a base supporting member and a separable food receiving member superimposed thereon, said members cooperating to form a closed air space extending between and substantially coextensive with the bottom of the food receiving member and the top of the base supporting member.

2. A cooking utensil, comprising a base supporting member and a food receiving member over and separably supported thereby, one of said members having annular ribs forming a groove between them, and the other member having a rib to enter said groove, said ribs being so proportioned as to form an air space between the top of the base supporting member and the bottom of the food receiving member.

3. A cooking utensil, comprising a lower base supporting member having a depending annular flange to support said member over the burner of a stove, said lower member having concentric ribs on its top spaced so as to form an annular groove, and an upper food receiving member having an annular rib to enter the groove of the lower member, said ribs proportioned to form a closed air space between said lower base supporting member and the bottom of the upper food receiving member.

4. A cooking utensil, comprising a base supporting member gradually diminishing in thickness from its center to its peripheral portions, and a food receiving member supported on the bottom member and forming therewith a closed air chamber under the food receiving member and over the base supporting member.

5. A cooking utensil comprising two members, one constituting a base supporting member and the other a food receiving member disposed thereon and having a dead air space between them, said dead air space extending substantially throughout the bottom of one of said members and the top of the other.

In testimony whereof, I have signed this specification in the presence of two subscribing witnesses.

JOHN C. BELL.

Witnesses:
LILIAN M. BECKROW,
ROY SCHALDENBRAND.